No. 712,350. Patented Oct. 28, 1902.
J. T. WILLIAMSON.
VALVE.
(Application filed June 2, 1902.)
(No Model.) 2 Sheets—Sheet 1.
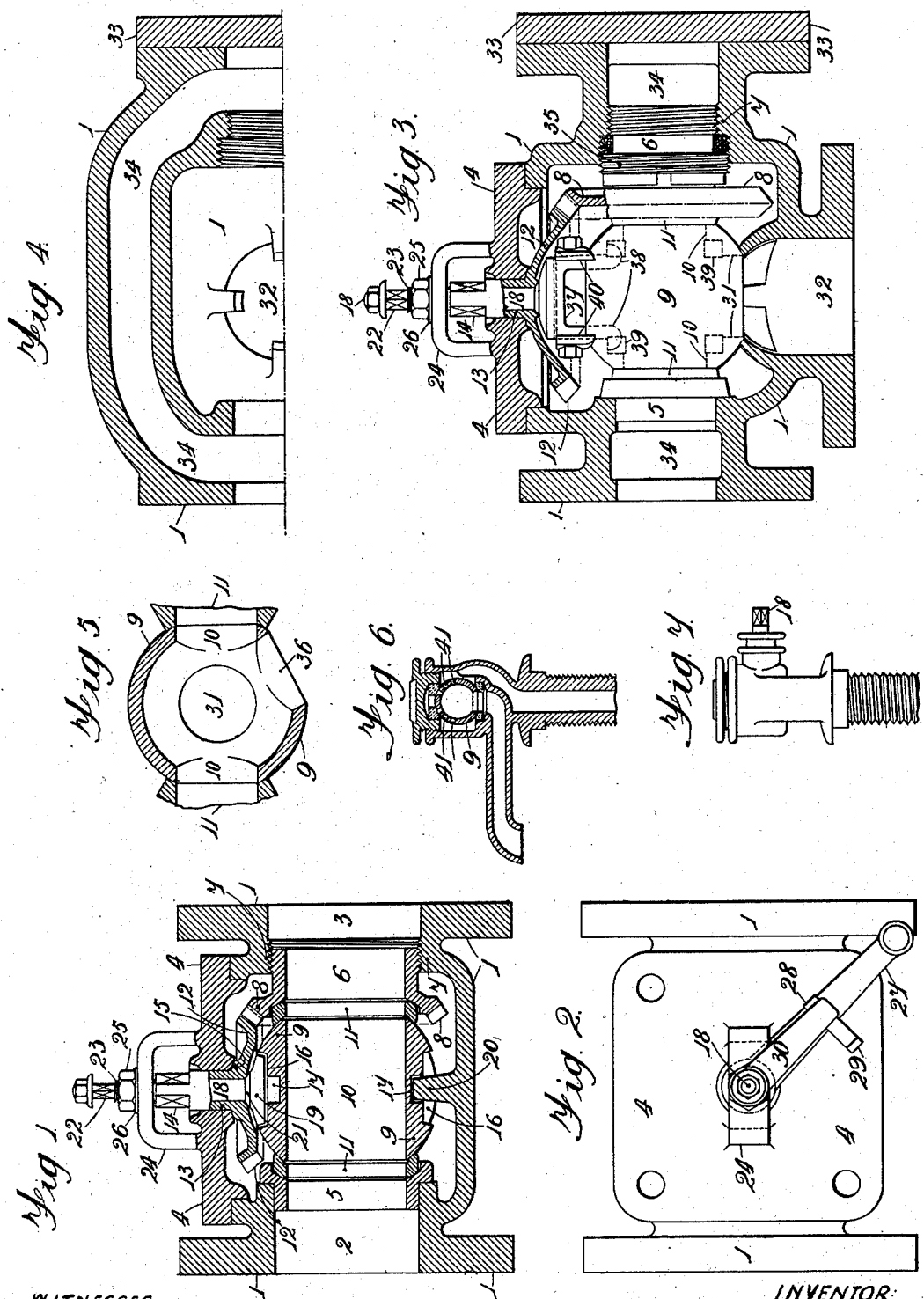
WITNESSES:
Fred White
Thomas Wallach
INVENTOR
John Tate Williamson, No. 712,350. Patented Oct. 28, 1902.
J. T. WILLIAMSON.
VALVE.
(Application filed June 2, 1902.)
(No Model.) 2 Sheets—Sheet 2.
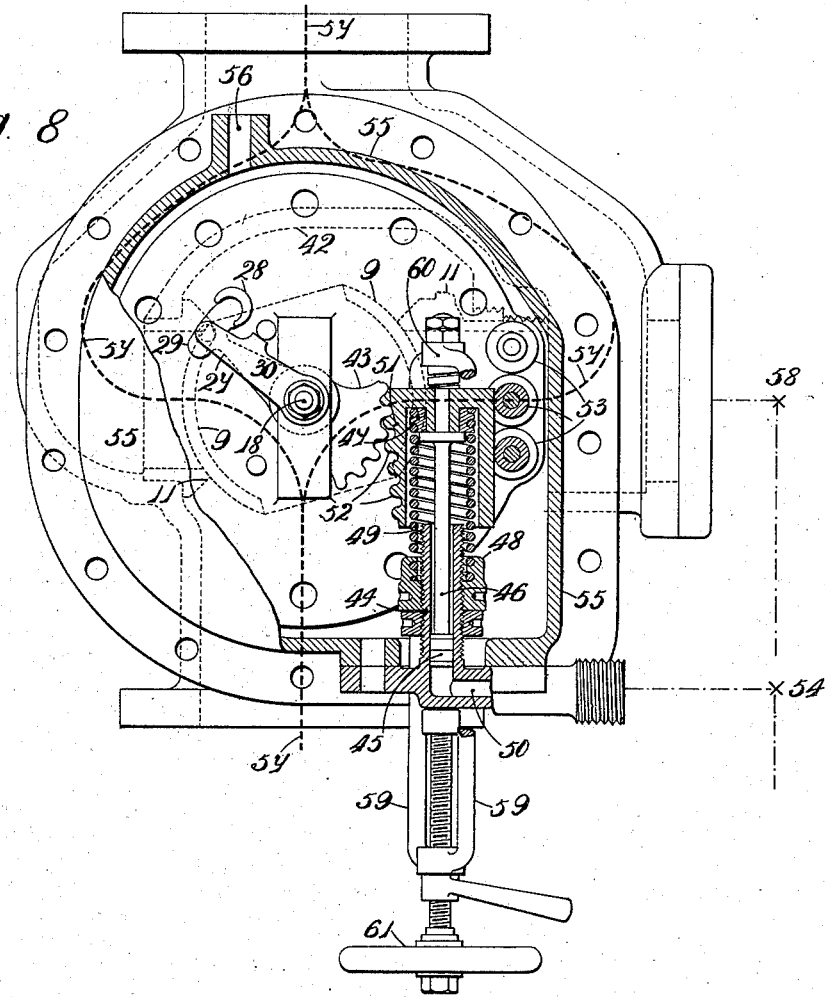
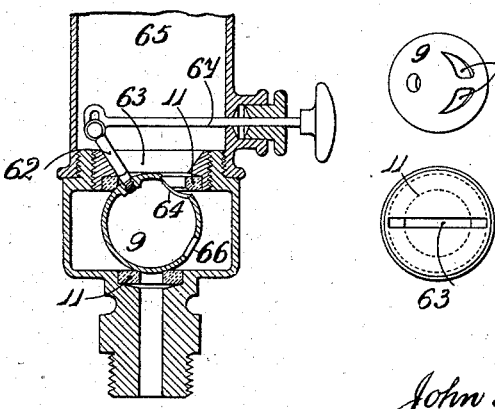
WITNESSES:
Fred White
Thomas Wallad
INVENTOR:
John Tate Williamson,
By his Attorneys:
THE NORRIS PETERS CO., PHOTO-LITHO., WASHINGTON, D. C.

UNITED STATES PATENT OFFICE.

JOHN TATE WILLIAMSON, OF GATESHEAD, ENGLAND.

VALVE.

SPECIFICATION forming part of Letters Patent No. 712,350, dated October 28, 1902.

Application filed June 2, 1902. Serial No. 109,896. (No model.)

*To all whom it may concern:*

Be it known that I, JOHN TATE WILLIAMSON, a subject of the King of Great Britain and Ireland, residing at and whose post-office address is Milton House, Albert Drive, Low Fell, Gateshead, in the county of Durham, England, have invented certain new and useful Improvements in Valves, (for which I have applied for a patent in Great Britain under No. 13,522, dated July 3, 1901,) of which the following is a specification.

This invention relates to valves of the ball or globular type or form, and has for its object to provide an equilibrium, self-centering, and adjusting full-way valve which shall be reliable and efficient in use with high or low pressures, easy to operate, and of simple construction.

Essentially the valve comprises a ball having a passage way or ways therethrough adapted to turn on an axis at right angles thereto, an adjustable seating on one side of the ball adapted to lock or release the ball against or from a seating on the other side thereof, a means for bringing the adjustable seating to or away from the said ball, and means for operating the valve and adjustable seating or seatings together or independently.

As will be apparent, the valve is generally applicable; but by way of exemplifying its uses I will explain, with the aid of the accompanying drawings, some constructions for different services to be hereinafter more particularly referred to.

Of the drawings, Figure 1 is a central section illustrating one form of the valve in which a single one-way port or passage is employed. Fig. 2 is a plan of the same. Fig. 3 is a central section of a modified form of valve. Fig. 4 is a half-sectional plan of same. Fig. 5 is a detail view of a further modification. Figs. 6 and 7 are sectional side and full rear elevations, respectively, of a water-tap embodying the invention. Fig. 8 illustrates a safety-valve adapted also for other purposes, and Figs. 9, 10, and 11 show the valve as applied to a lubricator.

Referring first to Figs. 1 and 2 of the drawings, 1 is a valve-box, having an inlet 2, an outlet 3, and a cover 4. 5 is a fixed bush on one side of the valve-box. 6 is a sleeve or bush screwed into the valve-box at 7 and adapted to be traveled endwise and on its axis by rotating a bevel-wheel 8, formed or provided thereon. 9 is the ball of the valve, having a cylindrical hole 10 therethrough. 11 11 are annular seats disposed between the ball 9, the bush 5, and bush or sleeve 6. 12 is a bevel-pinion adapted to engage and gear with the bevel-wheel 8 and provided with a hollow axle or sleeve 13, which passes through the cover 4 and terminates in a hollow hexagonal head 14. This pinion 12 has a mitered surface 15, adapted to engage a corresponding seating on the cover 4. 16 16 are oblong recesses formed in the ball of the valve. 17 17 are cylindrical recesses formed in said oblong recesses, and 18 is a spindle having an oblong head 19, adapted to engage loosely one of the oblong recesses 16, which latter are duplicated for the purpose of allowing the ball to be interchanged in position. The cylindrical recess 17 in the oblong recess not engaged by the head 19 of the spindle engages or may engage loosely with a pivot or steadying pin 20 in the valve-box. A mitered surface 21 is formed on the spindle 18 and engages a corresponding seating in the bevel-pinion 12, while a head 22 and threaded part 23 are likewise provided thereon. 24 is a bridge-piece adapted to hold the spindle 18 in position. 25 is a nut on said spindle, and 26 a spring-washer disposed between the nut 25 and the bridge-piece 24, all so arranged as to press the mitered surfaces 15 and 21 against their seatings, which thus replace the usual glands and packing and offer reduced friction to the turning of the valve-spindle. This construction provides a convenient outside means of adjustment for use where it may be necessary to adjust the device to various working pressures of steam or for the purpose of releasing the miters when regrinding the same in thin places. 27 is a handle mounted on the hexagonal head 14 and adapted to turn the bevel-wheel 8 and pinion 12, so that the sleeve or bush 6 and with it the annular seat 11 are advanced or retracted. Upon this handle 27 is mounted a tappet or striker formed with two projections 28 29, which engage a lever 30, secured to the spindle 18, and operate the same together with the valve after the movable seat 11 has been eased off the ball.

In use, assuming the valve to be closed and the adjustable seating drawn up against the ball, the first movement of the handle 27 turns the bevel-pinion 12 and wheel 8 and eases off the adjustable seat, while a further movement of the handle 27 causes the projection 28 of the striker or tappet to make contact with the lever 30 to turn the ball and open the valve, the rotary movement of the annular seat being meanwhile continued. When the handle 27 is turned in the other direction, the first movement is to advance the adjustable seating until the projection 29 of the tappet makes contact with the lever 30, when further movement turns the ball, closes the valve, and presses the seating closely thereagainst. To allow of the ball being locked by the seat in intermediate positions, the lever 30 can be operated independently or by controlling it by hand irrespective of the tappet or striker.

The adjustable seat is not necessarily in all cases a pressure-closing seat, but primarily a releasing and adjustable seat, whereby the ball is maintained in position against the opposite seat, which latter has been termed "fixed," but may be likewise an adjustable seat operated in the same manner as the adjustable seating described by the bevel-pinion 12.

The seats are not restricted to a narrow miter or bevel edge, as in the case of ordinary miter-valves, owing to the ball-valve having only a rotary movement, like a cock, where consequently more wearing-surface is an advantage. An additional advantage derived is the facility with which anything adhering to the surface of the ball is shaved off in closing or opening the valve.

When the valve is full open or closed, the cover, with spindle, sleeve, and pinion intact, may be removed while the pressure is on for examination of the parts. The valve can further be used as a by-pass by releasing the adjustable seat to its limit of travel, the fluid finding its way around the ball between it and the seats.

In the illustration described it will be understood that the seat-surfaces are spherical and that the passage-way 10 is a plain uninterrupted hole of equal area to the supply connection, disposed in a direct line between the two seats when full open, thus constituting a straight-through and full-way valve. Further, the ball has a limit of freedom between the seats and being spherical naturally finds its own center. It is thus not restricted to an absolute line of contact with its seats—a marked feature distinguishing it from other valves which do and which, in consequence of expansion, contraction, and unequal wear, are put out of their true or original line of surface-contact, with the result (in miter-valves) that the larger diameter of the valve is always being forced or wedged into the smaller diameter of the seat, causing jamming and involving the employment of considerable power to open and close them. The spherical form of my improved valve, on the other hand, insures uniform expansion and contraction, resulting in at all times and at all points of contact with the seats aforesaid a true closing-surface, which requires only a minimum of hand or mechanical power to easily effect the opening or closing. I have rather fully stated the distinction in the foregoing remarks between this and existing valves, as by these and other features I am able to introduce other developments for important purposes to be stated.

In Figs. 1 and 2 I have shown the valve with a straight-through passage; but I do not desire to restrict myself to this. Thus, as shown in the valve, Figs. 3, 4, and 5, I may have an additional passage 31 through the ball 9, intersecting the passage 10 at right angles thereto, and employ therewith a three-way-valve box, 32 being the inlet, and the delivery taking place through both of the seats 11 11, which can thus be in two directions when the blank cover 33 (shown in Fig. 3) is removed, or by means of a passage 34, connecting the seats, in conjunction with the cover 33 with delivery one way through either of the outlets; or, again, when either the passage 34 is or is not used the inlets and outlets may be reversed. When the inlet is at 32, it will be seen that steam or fluid is free to circulate around the ball while the valve is closed, and for this reason it may be necessary to fit the adjustable seat with a gland 35 or equivalent and packing to prevent leakage past the threaded portions at 7.

In addition to the aforesaid straight-through passages 11 and 31 I may have another port or opening 36, intersecting or communicating with both, as shown in Fig. 5. By this means there can be delivery in two directions at one time, as in the valve shown in Fig. 3, or the port or opening 36, if brought to coincide with either of the seats 11 11, can be caused to effect the delivery in one direction or the other alternatively, while the complete closure of the valve is obtained by turning the ball until the intact parts coincide with the seats. In this example the spindle 18 is loosely secured, as before, within a bridge-piece 37, Fig. 3, which is fashioned with hooks 38 38 and secured in position upon the ball by inserting them in notches 39 39, formed or cast in the opening-passages of the valve, and by plates 40 40, resting upon the outside of the ball and attached to the bridge-piece.

Referring now to Figs. 6 and 7 of the drawings, the valve in a modified form, it will be seen, is equally applicable for a water-tap, the seats being, say, of vulcanite material with their recesses shaped to give a little spring on the ball, thereby seldom using the adjustable seat. The spindle 18 may be fitted with a handle or weighted lever to close the valve. Various holes 41 41 allow the fluid to flow through the ball when in the position illustrated, while the other portions on either side shut off the supply when the ball is turned.

As illustrating other useful examples of the application of the valve, I will now refer to Fig. 8, where the arrangement disclosed may be used for safety-valves. The ball and seats are all arranged, as before, in a box 42, their position being indicated in dotted lines, while 27 is the handle mounted on the head 14 for the purpose of actuating the movable seating. It is furnished with a toothed quadrant 43 at one end and a striker or tappet 28 29 at the other adapted to engage and operate the lever 30, which is mounted on the valve-spindle 18. 44 is a small cylinder having a piston 45, piston-rod 46, and cross-head 47. 48 is an adjusting-nut screwed over the body of the cylinder, and 49 is a controlling-spring disposed between the nut 48 and cross-head 47. 50 is a steam-passage to admit pressure to the under side of the piston or plunger 45. 51 is a cap, which is provided with teeth 52, arranged at an angle to itself to gear with the teeth of the quadrant 43, which are eccentrically disposed, and 53 53 are antifriction-rollers for guiding the cap 51 in its movements. The spring 49 being adjustable allows of the lifting load on the aforesaid miniature piston to be varied as may be desired for the blow-off pressure, and the increasing resistance on the extension of the spring is counteracted by the eccentric leverage on the quadrant 43. The pressure is admitted to the under side of the piston 45 by a cock or its equivalent situated at 54, communicating with the boiler and passage 50. Abnormal pressure therefore elevates the piston 45, takes the slight "nip" of the seat off the ball, and causes the handle 27 to travel until contact is made between the projection 28 and the lever 30, when the released ball is rotated and the pressure reduced, after which the parts return to their normal position. I have illustrated that all the outside gear on the valve-box should or may be contained in a casing 55, attached to or formed as part of the valve-box, accessible only by a locked door or cover, said casing to contain oil for the purpose of constant lubrication of the gear. Hand-gear to open the valve may consist of a rod or bolt passed through the aperture 56 in the top of the casing to press upon the end of the handle 27. The strong dotted lines 57 57 show the divided direction of the steam by way of what amounts to a double-way valve, the travel and size of the ball being thus considerably less than would be necessary were it only a single-way valve. The foregoing serves also as a reducing-valve, the pressure in this case being supplied to the piston 45 from the valve-box or the reduced pressure side by, say, a cock situated at 58, the adjustable seat being in this case independently set to give the ball an easy-working fit, whereby the quadrant is fitted directly to the lever 30. When using it as an automatic shut-down valve, there may be combined therewith side rods 59 59, passing on either side of the cylinder 44 and attached to or formed as part of a cross-head 60, carried by the piston-rod 46. 61 is a hand-wheel stop-gear, which, it will be seen, will only allow of the valve being opened by the steam-pressure when released.

It will be observed in Fig. 8 that the cylinder and spring-power appear very small in proportion to the valve. These parts depend upon the initial pressure to the cylinder in each case. As the work to be done is comparatively small, consisting mainly of the frictional resistance to the turning of the ball against the miters of the spindle and sleeve, and these latter being small compared to those of existing valves of same capacity, the friction becomes very trifling. Further, it will be observed that I have no gland to the piston-rod, and there is no place where the gear is likely to offer any resistance when required to act under an emergency.

The invention is also applicable to lubricators and the like, as shown in Figs. 9, 10, and 11, where the ball 9 is arranged between two seats 11 11, one above the other, the upper one being capable of adjustment and then set. By means of a handle 62, secured to the ball and working in a slot 63 in the upper seat, the ball can be moved to cause the passages 64 64 therein to be uncovered to allow oil to enter from the reservoir or tank 65, the return movement closing these passages and alining the passage 66 with the delivery-opening of the lubricator. The movement of the handle 62 is effected by a rod 67, passing through a stuffing-box in the reservoir or tank. Of course, as will be readily understood, this reservoir or tank and rod for operating the handle 62 of the ball may be dispensed with and oil filled into the ball by hand when required.

For use with acids the ball and seats may be made of glass, vulcanite, or any suitable material.

What I claim as my invention, and desire to secure by Letters Patent, is—

1. The combination with a ball-valve, of an adjustable seat therefor, operating devices for said valve and seat adapted to be moved independently to operate said seat and said valve by separate movements, and means for bringing said devices into engagement with each other to operate both said seat and said valve by one movement.

2. The combination with a ball-valve, of a valve-box, a valve-seat, a sleeve screwing into said box for adjusting said seat toward and from said valve, and beveled gears for operating said sleeve.

3. The combination with a ball-valve, of an adjustable seat therefor, a spindle for operating said valve, and a spindle for operating said seat and concentric with said valve-operating spindle.

4. The combination with a ball-valve, of a valve-box, a valve-seat, a sleeve 6 screwing into said box for adjusting said seat toward and from said valve, bevel-gears 8 and 12 for operating said sleeve, a spindle 18 for operating said valve, a hollow spindle 13 surrounding said spindle 18 and connected to said bevel-gear 12, said spindles projecting out of said box, and operating-handles on said spindles outside of said box.

In witness whereof I have hereunto signed my name in the presence of two subscribing witnesses.

JOHN TATE WILLIAMSON.

Witnesses:
ARTHUR FREDERICK BURGESS,
EDMUND WARD PATTISON.